UNITED STATES PATENT OFFICE.

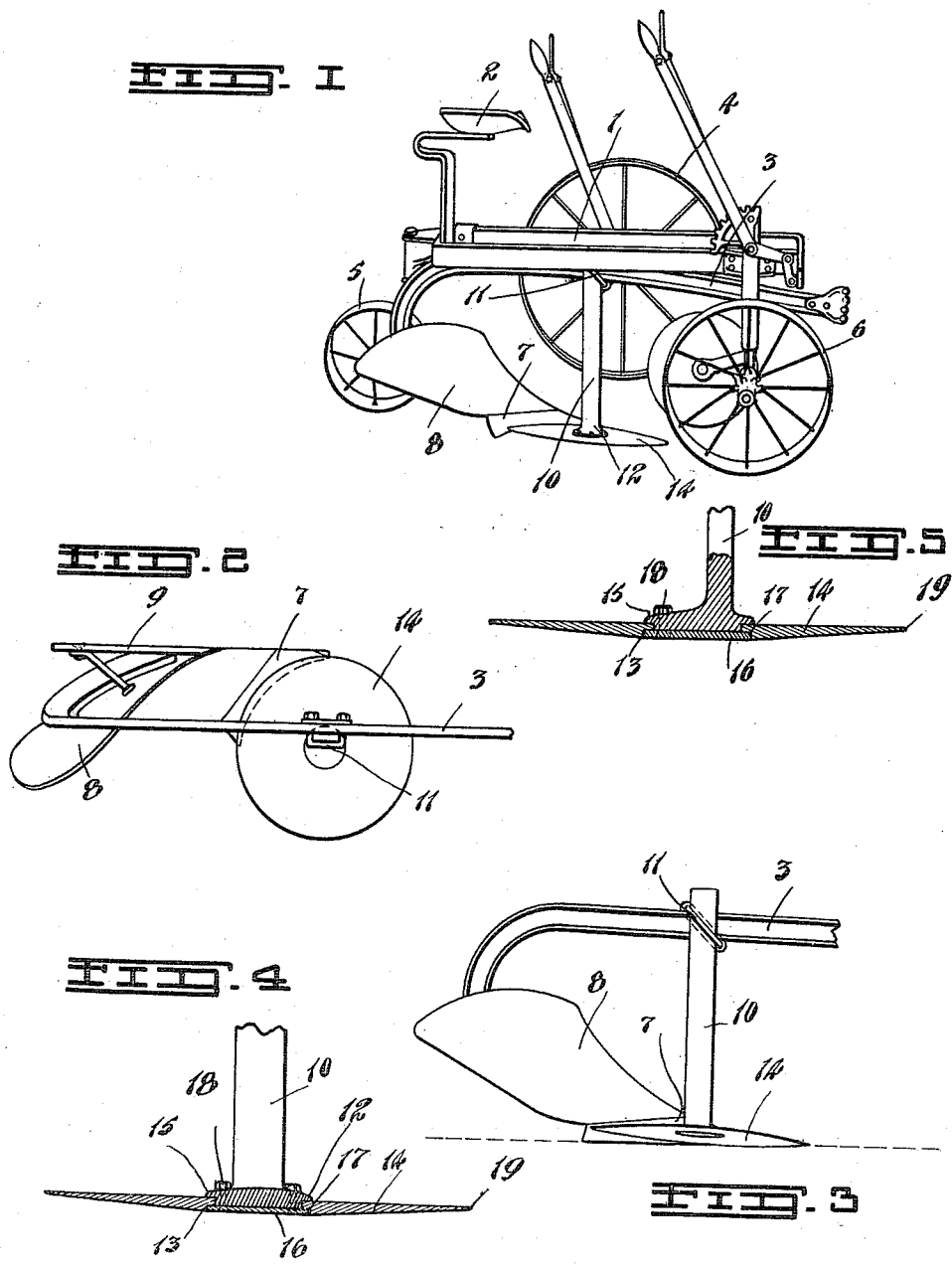

HUGH MONAGHAN, OF TOGO, SASKATCHEWAN, CANADA.

PLOW.

994,648.  Specification of Letters Patent.  Patented June 6, 1911.

Application filed January 28, 1910. Serial No. 540,702.

*To all whom it may concern:*

Be it known that I, HUGH MONAGHAN, of the village of Togo, in the Province of Saskatchewan, Canada, have invented certain new and useful Improvements in Plows, of which the following is the specification.

My invention relates to plows, and the object of the invention is to provide a disk used in conjunction with a plow which will minimize to a great extent the side draft at present found in plows and also lessen the friction in cutting thereby making the work a great deal easier for the draft animals.

It consists essentially in a rotatable disk carried by the plow beam and located immediately forward of the plow share, the disk being dipped slightly forwardly and also slightly to the landside, the parts being arranged, and constructed as hereinafter more particularly described.

Figure 1 is a perspective view of a plow with my invention attached. Fig. 2 is a plan view of the plow share, mold board, beam, and disk. Fig. 3 is a side elevation of the parts shown in Fig. 2. Fig. 4 is a vertical sectional view centrally through the disk, and a portion of the shank. Fig. 5 is a vertical sectional view centrally through the disk and a portion of the shank, the section being taken in a plane at right angles to that shown in Fig. 4.

In the drawings like characters of reference indicate corresponding parts in each figure.

1 represents the usual plow frame carrying the seat 2 and beam 3, said frame being supported by a carriage wheel 4, a caster wheel 5, and an adjustable wheel 6 as is usual. The plow beam carries the usual share 7, mold board 8, and land side 9, it being noticed that the plow beam is bent at its rear end to allow it to be attached to the mold board.

10 is a shank adjustably secured by a U-shaped bolt 11 to the plow beam 3, such shank appearing in a substantially vertical position to the ground and directly forward of the plow share. The lower end of the shank is flared outwardly at 11 and is provided with a flange at 12, the parts beneath the flange being contracted to form a shoulder 13.

14 is a circular disk having an opening 15 formed centrally therein whereby the disk can be fitted on to the lower extremity of the shank and abutting the shoulder 13.

The disk is held to the shank by means of a circular plate 16 which is counter sunk in the lower face thereof at 17 and firmly fastened to the end of the shank by bolts 18 having their heads counter sunk in the plate. The disk has its lower face beveled being thicker centrally than at the edge, it being understood that the edge 19 is sufficiently sharp to cut the soil as the disk rotates.

When the device is applied to a plow the shank is adjusted on the beam in such a manner that the disk overhangs slightly the share, the forward edge of the share being rounded out so that it is more or less concentric to the disk. The disk is attached to the shank so as to allow it to be tipped or inclined slightly forwardly and slightly toward the landside this distance amounting to possibly an inch when the plow is actually set up.

In order to allow the shank to be placed as far as possible from the landside we have constructed it with the lower end offset, as best shown in Fig. 5, where it will be seen that the disk does not rotate on an axial line passing through the center of the shank.

When the plow is being used the disk cuts into the ground and passes beneath it according to the adjustment of the wheels, and as the draft animals pull the plow forwardly the disk is rotated and after cutting the earth directs it to the plow share.

It is contended that the draft required to pull a plow of this kind is considerably less than that of the ordinary plow for the reason that the part actually cutting the earth, *i. e.*, the disk, rotates, instead of being stationary as is usual, thereby reducing friction to a large extent.

A further advantage gained is that the side draft is lessened, as the side draft on the disk on account of the dip given it tends to counteract the side draft on the share and mold board, such latter side drafts being in opposite directions.

What I claim as my invention is:

1. The combination with a plow beam and share of a standard adjustably secured to the plow beam forwardly of the share, a circular disk having a circumferential cutting edge rotatably mounted at the lower end of the standard with the cutting edge overhanging the share, said disk being dipped forwardly and to the landside of the plow, as and for the purpose specified.

2. The combination with a plow beam and share of a vertically extending standard adjustably secured to the beam, a circular disk having a circumferential cutting edge rotatably mounted at the lower end of the standard the cutting edge of the disk overhanging the share, said disk having its under side beveled and being dipped forwardly and to the landside of the plow, as and for the purpose specified.

3. The combination with a plow beam and share, of a vertically directed shank adjustably secured to the plow beam, said shank having its lower end flared outwardly to form a flange, the extremity being contracted beneath the flange to form a shoulder, a circular disk rotatably mounted on the end of the shank and abutting the shoulder, a plate counter-sunk in the face of the disk and bolted to the shank, said disk having its lower face beveled and the cutting edge overhanging the plow share, as and for the purpose specified.

4. The combination with a plow beam and share, of a vertically directed shank adjustably secured to the plow beam, said shank having its lower end flared outwardly and offset to form a flange, the extremity being contracted beneath the flange to form a shoulder, a circular disk rotatably mounted on the end of the shank and abutting the shoulder, a plate counter-sunk in the face of the disk and bolted to the shank, said flange and plate being constructed and united so that the disk is inclined forwardly and to the landside of the plow, and said disk having its under face beveled, and its cutting edge overhanging the plow share, as and for the purpose specified.

Signed at Winnipeg in the Province of Manitoba, this 9th day of December 1909.

HUGH MONAGHAN.

In the presence of—
G. S. ROXBURGH,
M. A. SOMERVILLE.

---

Copies of this patent may be obtained for five cents each, by addressing the "Commissioner of Patents, Washington, D. C."